Figure 4:
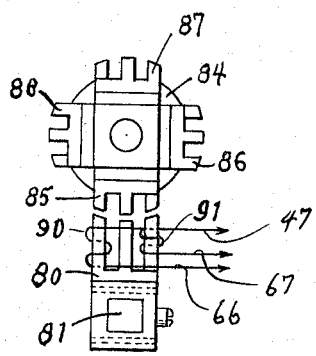

Aug. 9, 1966    H. H. JOHNSON    3,265,951
POSITION SENSING SYSTEM
Filed July 16, 1962    2 Sheets-Sheet 1
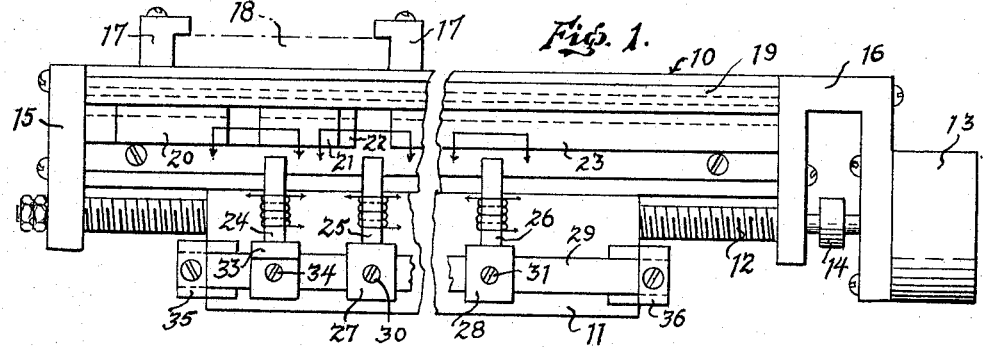
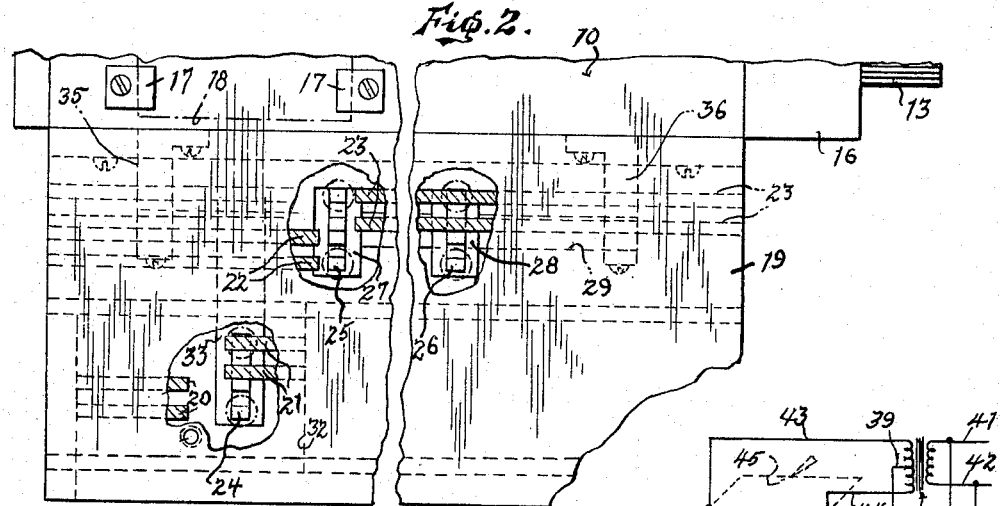
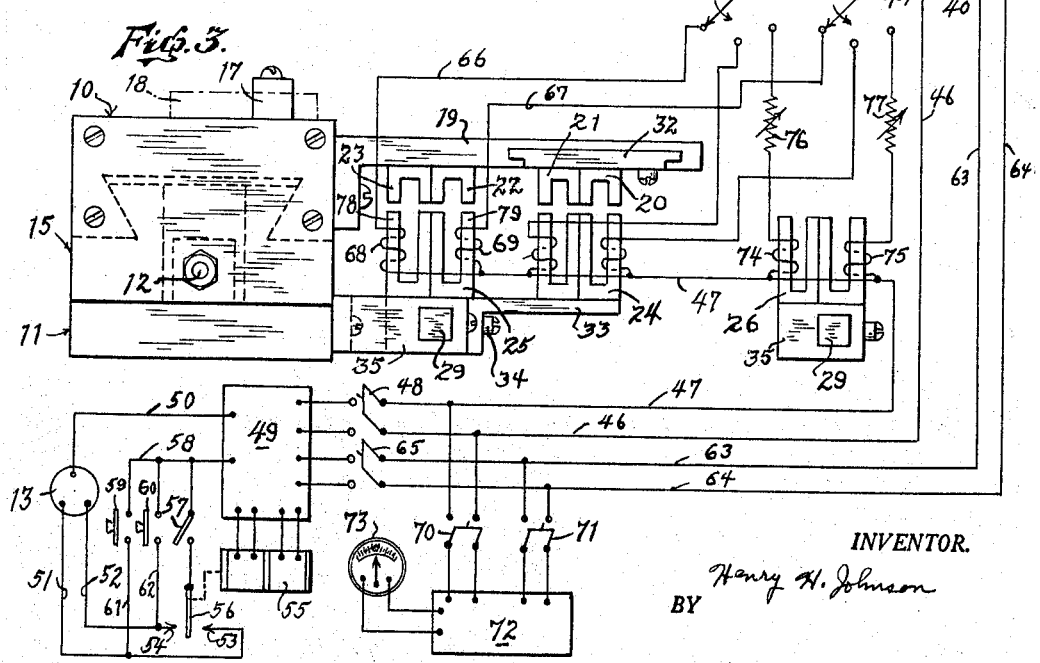
INVENTOR.
Henry H. Johnson
BY Aug. 9, 1966

H. H. JOHNSON 3,265,951

POSITION SENSING SYSTEM

Filed July 16, 1962

2 Sheets-Sheet 2

INVENTOR.
Henry H. Johnson
BY

United States Patent Office 3,265,951
Patented August 9, 1966

3,265,951
POSITION SENSING SYSTEM
Henry H. Johnson, 494 58th St., Oakland 9, Calif.
Filed July 16, 1962, Ser. No. 209,835
15 Claims. (Cl. 318—467)

This invention relates in general to the field of position sensing devices and relates particularly to devices for producing control voltages that can be used to indicate and/or control the position of one moveable member to any one of a number of exact positions relative to a second member, as for example, the point-to-point movements of a machine tool slide into a number of positions for machining operations.

It is an object of the invention to provide a position sensing device for controlling the point-to-point relative movements of one machine member with respect to another member in an effective and accurate manner.

Another object of the invention is to provide an electromagnetic control system for machine tools having a null point balanced signal system that can be mounted directly upon two cooperating relatively moveable members and accurately fastened directly upon said moveable members without contact or wearing surfaces between the sensing elements, can be easily set up with no special training, and is inexpensive in first cost and operation and in which the cooperating sensing elements can be electrically balanced within certain limits without any physical adjustment.

A further object of the invention is to provide a magnetic sensing system which when used with an associated electric motor and amplifier circuit may be employed to automatically move one member into any one of a number of exact relative positions with respect to a second member with great accuracy.

A further object is to provide a magnetic sensing device for indicating the relative positions of two members when one member is either very accurately at, or indicate in which direction one of said members is from the other of said members at a number of positions with respect to said other member.

A further object is to provide a device for indicating when one of two members is very accurately at, or in which direction said member is from the other of said members and provide means when used with suitable motor and amplifier motor control to move said member relative to the other of said members to exact cooperating positions which can be very close to each other.

A further object is to provide a device with a position sensing device which will give a magnified signal change for a small physical movement between two relatively moveable members.

A further object is to provide an electro-magnetic control system for a machine tool slide having a position sensing device which is accurate even with some misalignment and in which the effects of any misalignment both up and down as well as sideways will tend to cancel out.

It is common practice in many machining operations for a wide variety of work to clamp the work in a jig or fixture, perform some machining operation such as drilling, then unclamp and transfer the work to another jig or fixture, clamp and perform another operation such as drilling, tapping, reaming, counterboring, boring, etc., and continue this procedure until the work is fully machined. This procedure requires time for transfer, clamping and unclamping and usually requires manual effort. By this procedure work location errors are often introduced because of chips, wear of locating means, tolerances in location means such as pin to hole, a variation of clamping pressure and changes in the locating surfaces. Further, the making of jigs and fixtures requires engineering design time, tool makers time and increases greatly the time before a part can be put in production. To eliminate many jigs and fixtures, numerical control has been developed and often permits using only a work-holding fixture. Numerical control usually controls work positions and machine operations and sometimes tool selection, with an accuracy of locating the work to within plus of minus 0.0005. This numerical control however is expensive, usually requires tape preparation and accessories such as a computer and specially trained personnel, and the work location accuracy usually relies on the precision of a lead screw which is subject to wear. It is therefore a primary object to provide a control system with a novel sensing means by which the work can be accurately moved from point-to-point, where like machining operations can be performed or where various machine operations can be carried out at different points using a turret head or other tool carrying means.

Other objects and advantages will be in part evident to those skilled in the art and in part pointed out hereinafter in the following description taken in connection with the accompanying drawings, wherein I have shown by way of illustration and not of limitation a preferred embodiment of my invention.

Figure 5:
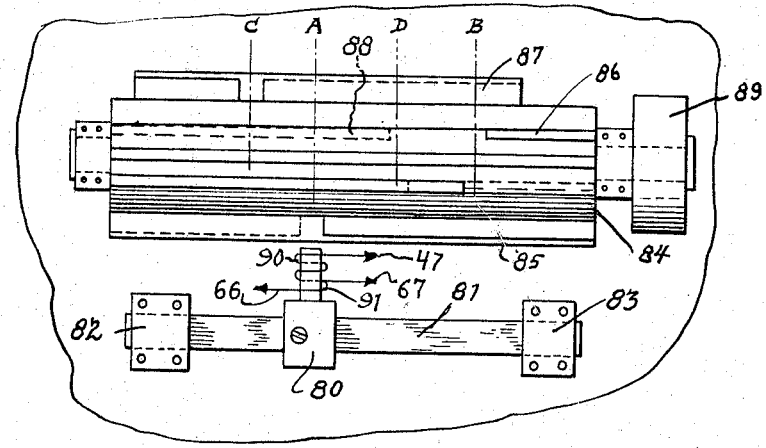
Figure 6:
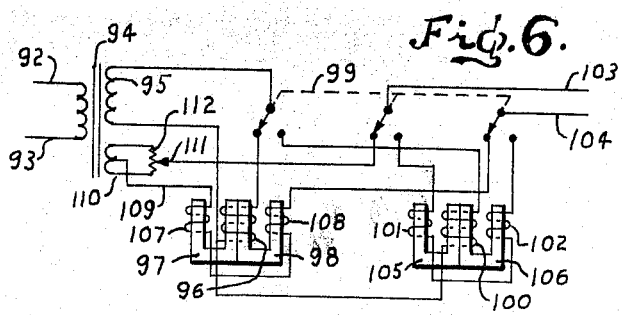

In the accompanying drawings, wherein like numerals refer to like parts throughout the several views:

FIGURE 1 is a diagrammatic view of a motorized machine slide with the position sensing means attached, FIGURE 2 is a broken plan view of FIGURE 1, FIGURE 3 is an end view of FIGURE 1 with the control circuit, indicator, indicator amplifier-detector, motor, amplifier and motor control means and slide position selecting means added, FIGURE 4 is a schematic showing of parts of position sensing director rails in another form, and FIGURE 5 is a side view of the showing of FIGURE 4, FIGURE 6 is a schematic showing another form of detector circuit.

In FIGURE 1 and 2 of the drawings I have shown my invention as applied to a machine tool slide having a laterally movable work supporting member or slide 10 that is movable relative to the machine slide base 11. The machine slide 10 is driven by a lead screw 12 that is operated by a suitable motor 13 through a coupling 14. The lead screw 12 is mounted between two brackets 15 and 16 that are carried by the movable member 10 and has a threaded connection with the member 11 so that when the lead screw 12 is turned by the motor 13 the work supporting member 10 will be moved, as here viewed, to the right or left, depending upon the direction in which the lead screw 12 is turned. As a means for securing work upon which an operation is to be performed there are two dogs or clamps 17. These clamps 17 are applied to work 18, here indicated by a dot and dash line. Extending along the side of the movable member 10 there is an outwardly extending shelf-like bracket 19 to the underside of which there is secured a plurality of director rails 20, 21, 22 and 23 that extend parallel with the line of travel of the movable member 10. Associated with the director rails 20 and 21 there is a detector member 24 that moves along the path of the director rails 20 and 21 as the movable member 10 travels from one position to another. Associated with the director rails 22 and 23 I show two detector members 25 and 26 which like the detector member 24 move along the paths of these director rails. As will be hereinafter pointed out, the detector members 24, 25 and 26 are each provided with voltage generating coils that can be selectively connected into the circuit of an external source of electric power. The director rails 22 and 23 are secured in a fixed position upon the underside of the shelf like bracket 19, while the detector members 25 and 26 are mounted for longitudinal adjustment with respect to these director rails. In this instance, as clearly shown in FIGURES 1 and 2, the detector members 25 and 26 are carried by supports 27 and 28, both of which are slidably mounted upon a supporting rod 29 and have set screws 30 and 31 by which they may be fixed in any desired position therealong and with respect to the director rails 22 and 23 with which they cooperate. In this showing the director rails 20 and 21 are positioned laterally at one side of the director rails 22 and 23 and they are mounted upon a slidable support 32 so that their longitudinal location may be adjusted in the direction of travel of the movable member 10. The detector member 24 which is associated with the director rails 20 and 21 is also displaced laterally with respect to the detectors 25 and 26 and is shown as mounted upon an extension bracket 33 that is also adjustable along the supporting rod 29 and secured by the set screw 34 in any position as will be determined by the setting of the slidable support 32 upon which the related director rails 20 and 21 are mounted. At this point it will be understood that the lead screw 12 is so mounted between the supporting brackets 15 and 16 that there will be no end play or backlash. In this arrangement member 11 will remain stationary as the director rails 20, 21, 22 and 23 carried by the overhanging shelf 19 move with the relatively movable work supporting member 10. The detector supporting rod 29 is mounted between outboard brackets 35 and 36 that are carried by the relatively movable member 11 and in this instance it will remain stationary and thus support the detectors 24, 25 and 26 in the fixed positions to which they are adjusted as the director rails 20, 21, 22 and 23 as related therewith move with the movable member 10, which in this showing will be the work supporting bed of the machine slide being controlled. It should be also understood that the driving motor 13 should be of the reversible type and be equipped with an internal or directly connected brake that will become operative to stop the motor immediately upon and simultaneously with any interruption in the supply of current thereto. The motor 10 should preferably be of a reversible variable speed type so that its speed in either direction may be controlled. As an alternative a speed reducing drive by which the speed of the lead screw 12 may be controlled within the desired speed range may be used. The motor 13 may be of the direct or alternating current type and should operate in a manner that will make possible a rapid or slow travel in the forward or reverse movements of the detectors 24, 25 and 26 with respect to their related director rails 20, 21, 22 and 23.

With the above description of the physical elements of my invention, reference is now made to FIGURE 3 of the drawings for a detailed description of the electrical control circuits and mode of operation as contemplated by the director and detector arrangement above described. As here shown, the detectors 24, 25 and 26 are arranged to be selectively and electrically connected to the secondary 39 of a transformer 40, the primary of which is connected to a source of power by conductors 41 and 42. The terminals of the transformer secondary 39 are connected by conductors 43 and 44 to a three position gang switch 45 so that only one of the detectors 24, 25 or 26 will be operative for each desired setting or positioning of the work supporting bed or movable member 10. A conductor 46, connected to the center tap of secondary 39 of transformer 40, and a conductor 47, which is common to all of the detectors, provides the detector voltage control circuit. This control circuit is completed through a double pole switch 48 to the input side of a power amplifier 49. The output of the amplifier 49 is carried by a conductor 50 to one side of the motor 13 which is shown as having three terminals. The remaining two of these three motor terminals are connected through conductors 51 and 52 to opposed terminals 53 and 54 of a differential relay 55 which is shown in the drawing as having a movable contact arm 56 that is connected through a manual control switch 57 to a second conductor 58 which completes the output circuit of the amplifier 49. The power amplifier 49, being voltage and phase sensitive operates through suitable connections with the differential relay 55 to drive the motor in one direction with one relative phase and in an opposite direction with the opposite relative phase at a speed related to the magnitude of the control voltage. With zero voltage the amplifier 49 will not operate relay 55 or the motor. The selected detector as influenced by its cooperating director supplies the control voltage of proper phase and magnitude as will hereinafter appear. As an alternative for the differential relay 55 I have also provided for manual control of the motor 13 by the use of push buttons 59 and 60 that are respectively connected in circuits 61 and 62 which are connected between the amplifier and the differential relay circuit conductors 51 and 52. With these push buttons it will be seen that the motor 13 may be manually controlled for operation in either direction when the switch 57 of the differential relay circuit is open. In order to render my control system responsive to voltage phase as well as the magnitude of the voltages produced by the detectors 24, 25 and 26, I employ the power circuit as a phase reference which includes the conductors 63 and 64 that extend from power line conductors 41 and 42 to the input of the power amplifier 49 through a switch 65.

When the apparatus is finally set up for a particular series of machine slide movements, the control effected through the power amplifier and differential relay will automatically bring the machine slide to the desired position for the machining operation as will be determined by voltages generated by one or the other of the detectors 24, 25 or 26. Each position will be determined by which one of these detectors is connected into the control circuit by the gang switch 45. For example, the gang switch 45 is shown in FIGURE 3 of the drawings as connected through conductors 66 and 67 to coils 68 and 69 of the detector 25. The circuit through these coils to the power amplifier 49 is completed through the conductor 47 which is common to each of the coils 68 and 69 and then via the conductor 46 to the center output tap of the power transformer 40. With these connections and with the detector 25 in the position as shown in FIGURES 1 and 2, the coils 68 and 69 thereof will be in balance or at a null point. This null point balance will indicate that the machine slide is properly positioned with respect to the machine slide base for the operation to be performed thereby and no power will be delivered to the motor 13. However, as the detector 25 is moved in either direction from its null point, as here shown, a voltage will be generated in the circuit controlled thereby which will cause the amplifier 49 to operate the differential relay 55 on with the switch 57 closed thus close the motor circuit through one or the other of the relay contacts 53 and 54. This will cause the motor 13 to operate in one direction or another until the null point of the detector 25 has been established. Connected across the control voltage circuit conductors 46 and 47 and the power circuit conductors 63 and 64 through switches 70 and 71, there is a phase sensitive amplifier detector 72 that has connections with a null point indicating meter 73. When switches 70 and 71 are closed, amplifier 72 will operate the null point meter 73 to provide an indication to one side of center when the control voltage across conductors 46 and 47 is of one phase with respect to the supply voltage across conductors 63 and 64, and to the other side of center when the control voltage is of relatively opposite phase. The position of the pointer of the null meter 73 will make it possible to determine in which direction the slide 10 is from a known relative position with respect to the slide base 11 and also when the slide is at said relative position. Therefore, by adjusting the position of one or the other of the detectors, for example, as here shown the detector 25, a condition of balance in the control voltage circuit to the amplifier 49 will result in the circuit of the motor being opened and the machine slide will come to rest at this point. If the machine slide is in the desired relative position with respect to the machine slide base and with switch 57 open and switches 70 and 71 closed and switch 45 turned to the detector to be employed, this detector can be moved by manual control to its null position by observing the null point meter 73.

To complete the detector portions of the above described circuit arrangement, it will now be noted that the input circuit of the power amplifier 49 as provided for by the conductors 46 and 47 includes two magnetic coils 68 and 69 of the detector 25 which are connected at one end to the common conductor 47 and at their upper ends the coils 68 and 69 are connected respectively through conductors 66 and 67 to the gang switch 45 and then through conductors 43 and 44 and to the terminal ends of the transformer secondary 39. The magnetic coils of each of the detectors 24, 25 and 26 are preferably wound in magnetically opposed relation and connected across opposite halves of the center tapped transformer secondary 39. The circuits of these detector coils are all completed through the common conductor 47. The detector 25 windings 68 and 69 complete a circuit when the gang switch 45 is moved to the right and into engagement with terminals of these coils. When the detector 26 is in control the circuit of its two coils, designated by the numerals 74 and 75, will be completed when the gang switch 45 is moved to complete the circuits thereof as described in connection with the detector 25. At this point it will be noted that the magnetic coils 74 and 75 of the detector 26 are shown as connected to the terminals of the gang switch 45 through two adjustable resistance units 76 and 77, the purpose of which will be explained later.

In operation when alternating current is supplied by wires 41 and 42 to transformer 40, conductors 43 and 44 will carry current to gang switch 45. In the position shown gang switch 45 will then direct a flow of current from the secondary of transformer 40, via wires 66 and 67 to coils 68 and 69 of detector 25. If the voltage across coil 68 is equal to the voltage across coil 69, there will be no control voltage across the conductors 46 and 47, which latter conductor is common to one side of all coils of all the detectors. If the voltage across coil 68 is greater than the voltage across coil 69, there will be a voltage difference across conductors 46 and 47 of a certain phase relative to the phase across conductors 63 and 64. If the voltage across coil 68 is less than the voltage across coil 69, the voltage across conductors 46 and 47 will be of opposite phase relative to the voltage across conductors 63 and 64. If it is assumed that the machine slide 10 is moved to the limit of travel to the left over the slide base 11 the detector pole 78 which carries coil 68 will have its flux path completed by associated director rail 23, but detector pole 79 carrying coil 69 will have no flux returned by director rail 22. Therefore more flux will flow through coil 68 than through coil 69 and there will be more voltage across coil 68 than across coil 69. This will produce a substantial control voltage across wires 46 and 47, of a certain phase with respect to the voltage across wires 63 and 64, as the director rails 23 move over detector 25 until near the null balance position which is shown in FIGURES 1 and 2. As the machine slide and director rails move to the right to near the null balance position, pole 78 of detector 25 will have much less flux returned by director rail 23 and pole 79, much more flux returned by director rail 22, until at the null balance position the flux through each coil is balanced and the voltages across each coil will be equal. As the machine slide moves a small distance further to the right, the flux through pole 78 diminishes rapidly while the flux through pole 79 increases rapidly to make the voltage across coil 69 substantially greater than across coil 68 producing a substantial control voltage across wires 46 and 47 of opposite phase with respect to the phase of the voltage across wires 63 and 64. This control voltage will then continue as the machine slide travels further to the right however far. Thus at the null balance point, the voltage across wires 46 and 47 is zero but increases rapidly to a substantial voltage with a small relative movement of the detector to either side of the director balance point, and the voltage then remains substantial for further outward movements on either side with the control voltage phase with the detector on one side of the null balance point opposite to the phase with the detector on the other side. Control voltage will be furnished for any distance of relative member movement as long as director rails cooperate with the operative detector. While in this instance, the relative member movements are shown in a straight line, member movements in arcs, parts of circles or curves can be used with this position sensing device by making the director in a curve which will permit the director rails to cooperate with the detector throughout the range of relative movement. Note that as the director starts at the left and moves to the right over the detector 25, the voltage across coil 68 will be substantially higher than the voltage across coil 69 until the director balance point nears the detector when the voltage across coil 68 will decrease and at the null balance point become equal to the voltage across coil 69. Then as the director moves a little further to the right, the voltage in coil 68 will further decrease rapidly and become substantially less than the voltage in coil 69 and remain less for the remainder of the director travel.

One purpose of the adjustable resistances 76 and 77 is to permit an adjustable displacement of the detector with respect to the director balance point over a small range with the control voltage remaining substantially zero. When gang switch 45 is switched to detector 24 and adjustable resistances 76 and 77 are adjusted equal in resistance and to the center of their range, the same amount of flux flowing through coil 74 as through coil 75 will produce equal voltages across coil 74 and resistance 76 and coil 75 and resistance 77, and so there will be zero control voltage across wires 46 and 47. If adjustable resistance 76 were to be decreased a little and adjustable resistance 77 increased a like amount, there would be less voltage drop across resistance 76 than across 77 and the control voltage would not be zero until the director null balance point, and slide, moved to make enough more flux go through coil 74 than through coil 75 to make the voltage drop across coil 74 and resistance 76 equal to the voltage drop across coil 75 and resistance 77 which will make the control voltage across wires 46 and 47 zero. Adjustment of these resistances permits shifting the machine slide a small distance to either direction without moving the detector. The resistances can be ganged to provide one knob control with a quite constant resistance throughout their range of adjustment and calibrated to facilitate very small relative member position adjustments. A second purpose of adjustable resistances 76 and 77 is to facilitate detector adjustment. If the slide member 10 were precisely at a desired position, and it is found difficult to lock the detector in the exact position to make the control voltage a value of zero, as can be seen by the null indicating meter 73, the detector can be locked close to the director null balance position and the resistances 74 and 75 adjusted to give a control voltage of zero value.

Great sensitivity near the null position is achieved because two flux gaps in the flux path going through one coil is lengthened, while the two flux gaps in the flux path going through the opposite coil is shortened a like amount for a given detector to director movement as one member moves relative to the other.

In the above description and as shown in FIGURES 1, 2, and 3 of the drawings, there is shown and described an arrangement employing three detectors 24, 25 and 26, only one of which is operative at a time as will be determined by the circuit established through the gang switch 45. When gang switch 45 is in the position shown, only detector 25 will be in operation and responsive to director rails 22 and 23. When the gang switch 45 is moved to the next position, detector 24 will be energized and will be responsive to director rails 20 and 21. When switch 45 is moved to its third position, detector 26 will be energized and responsive to and operate in association with director rails 22 and 23. For each selected relative position of members 10 and 11, the null point of a set of director rails, or rail system, is positioned over an energized detector.

To permit positioning of the machine slide 10 at very close positions with respect to the stationary member 11, the detector 24 is adjustable along its supporting rod 29 and its cooperating director rails 20 and 21 are mounted on the slide 32 which is adjustable along the path of movement of member 10. By using a number of detectors mounted like detector 24, and a number of cooperating rails or director units like 20 and 21, mounted to be axially adjustable, like slide 32, the machine slide 10 can be located in any one of a number of positions as closely as desired. Care must be taken to have the director rails extend far enough along the line of travel to cooperate with the energized detector from one position to the next.

FIGURES 4 and 5 show an arrangement wherein a single detector 80 is mounted upon supporting rod 81. The position of the detector between supporting brackets 82 and 83 can be determined relative to a drum type support 84 that carries four different director rail systems 85, 86, 87 and 88. Each rail system is shown as having a null point located in axially spaced relationship. As indicated in FIGURE 5, the null point of the director rail system 85 is at A, and the null points of director rail systems 86, 87 and 88 is at points B, C, and D respectively. The drum type support 84 is here shown as indexed by a motor or other means 89 to enable selection of any rail system to cooperate with detector 80. Detector 80 has two coils 90 and 91, which serve the same purpose as coils 68 and 69 of detector 25 as shown in FIGURE 3. Gang switch 45 would not be needed, being replaced by motor 89. In this arrangement, the positions of the members are determined by the position of the null point on the director system cooperating with the detector 80. The director rail systems 85, 86, 87 and 88 can be made axially adjustable.

FIGURE 6 shows another detector circuit with a position selector switch and another form of electrical position adjustment. Wires 92 and 93 connect transformer 94 to an alternating source of power. One secondary winding 95 connects to coil 96 to produce alternating magnetic flux in detector cores 97 ad 98 when gang switch 99 is in the position shown. When gang switch 99 is turned to the other position, coil 100 will be connected to the power source and the detector coils 101 and 102 will be connected through gang switch 99 to control voltage output leads 103 and 104. Coils 101 and 102 should be wound in opposition so with equal flux flowing through cores 105 and 106, the voltages across coils 101 and 102 will buck each other to produce a control voltage of zero value. When switch 99 is in the position shown, the contribution of the voltage across coil 107 relative to the voltage across coil 108 to the control voltage can be changed by adding or subtracting the voltage contributed by the voltage across the center tap 109 of transformer secondary 110 and the slider 111 on potentiometer 112. When the slider 111 is centered on potentiometer 112 there will be no corrective voltage applied, but when the slider is moved one way, a voltage of one phase will be added and then to produce a control voltage of zero value, more flux will have to flow through core 97 than through core 98. When the slider is moved the other way, a control voltage of zero value will be obtained only when more flux flows through core 98 than through core 97. This permits adjustment of the detector within a small range at the director null point and serves the same purpose as do resistances 76 and 77.

There are other embodiments which one skilled in the art could use. As an example, in FIGURE 3, detector 25 could be divided into a first detector unit including coil 68 and core with pole 78, and a second detector unit including coil 69 and core with pole 79. It would then be possible to move the first detector unit with its cooperating director unit 23 in the same relative position, as best seen in FIGURE 2, along the path of relative member movement closer to, or further from, the second detector unit which would remain in the same relative position with respect to cooperating director unit 22. It would also be possible to attach the first detector unit to the first member with a cooperating first director unit attached to the second member, and a second detector unit attached to the second member with a cooperating director unit attached to the first member. Any arrangement of detector units and director units can be used as long as one director unit cooperates with one detector unit as the first member moves from one end of desired travel however far, to a little past one exact position relative to a second member, and a second director unit cooperates with a second detector unit as the first member moves from a relative position just before the exact position to the other end of desired travel however far, with respect to the second member.

While I have, for the sake of clearness and in order to disclose my invention so that the same can be readily understood, described and illustrated a specific form and arrangement, I desire to have it understood that this invention is not limited to the specific forms disclosed, but may be embodied in other ways that will suggest themselves to persons skilled in the art. It is believed that this invention is new and all such changes as come within the scope of the appended claims are to be considered as part of the invention.

Having thus described my invention, what I claim and desire to secure by Letters Patent is:

1. In a position sensing system to produce a control voltage suitable for use in locating the position of a first member to an exact position with respect to a relatively movable second member from any relative position within the travel range of said members, however far, the combination comprising, a detector connected to said second member, a director connected to said first member and arranged to cooperate with said detector as said first member moves relative to said second member, means to energize said detector, means to produce an output voltage in said detector controlled by the cooperation of said director with said detector as said first member moves relative to said second member; a control voltage responsive to the output voltage in said detector, said director cooperating with said detector in a manner which contributes to make said control voltage of zero value when said first member is at said exact position and to change rapidly to become of substantial value as said first member moves a small distance in one direction from said exact position, then to make said control voltage remain approximately at this substantial value as said first member moves to one end of desired travel, however far, relative to said second member in the same direction.

2. In a position sensing system to produce a control voltage suitable for use in locating the position of a first member to an exact position with respect to a relatively movable second member from any relative position within the travel range of the members, however far, the combination comprising, a first detector unit attached to one of said members, a first director rail attached to the other of said members, a second detector unit attached to one of said members, a second director rail attached to the other of said members; means to energize said detector units, said first director rail cooperating with said first detector unit as said first member moves from one end of desired travel to a point near said exact position and said second director rail cooperating with said second detector unit as said first member moves from the other end of desired travel to a point near said exact position with respect to said second member, with the cooperation of said first and second director rails with respective detector units causing voltage changes in said detector units, said control voltage being responsive to voltage changes in said detector units; with the director rails cooperating with the detector units to make said control voltage of zero value when said first member is at said exact position, and to make the contribution of said first detector unit to said control voltage greater than the contribution of said second detector unit when said first member is to one side of said exact position, and less when first member is to the other side of said exact position, said first and second director rails cooperating with respective detector units in a manner to cause said control voltage to change rapidly to become of substantial value as said first member moves a small distance in one direction from said exact position; then to make said control voltage remain approximately at this substantial value as said first member moves to its end of desired travel, however far, relative to said second members in the same direction, and to make said control voltage change rapidly to a substantial value as said first member moves a small distance in the other direction from said exact position, then to make said control voltage remain approximately at this substantial value as said first member continues in the same direction to the other end of desired travel, however far.

3. The invention as set forth in claim 2, with means to make the contribution of said first detector unit to said control voltage unequal to the contribution of said second detector unit to said control voltage when said control voltage is of zero value.

4. The invention as set forth in claim 3, said first and second director rails cooperating with respective detector units in a manner which contributes to make the control voltage of one relative phase when said first member is to one side of said exact position with respect to said second member, and to make the control voltage of opposite phase when said first member is to the other side of said exact position.

5. In a position sensing system for locating the position of a first member at one of a number of exact positions with respect to a relatively movable second member, the combination comprising, a detector, said detector having a first and a second detector unit, a director rail system, said director rail system having a first and a second director rail, said detector unit attached to one of said members, said first director rail attached to the other of said members and arranged to cooperate with said first detector unit as said first member moves from one end of desired travel to near said exact position relative to said second member, said second detector unit attached to one of said members and arranged to cooperate with said second detector unit as said first member from the other end of desired travel to near one exact position relative to said second member, with the number of detectors plus director rail systems greater than two, means to energize one detector, means to put in operation one energized detector with one cooperating director rail system to select one of a number of exact positions of said first member relative to said second member, with the cooperation of said cooperating director rail system with said energized detector causing voltage changes in said energized detector as said first member moves relative to said second member, a control voltage responsive to voltage changes in the first and second detector units of the energized detector, and means responsive to said control voltage to locate said first member to one of a number of selected exact positions with respect to a second relatively movable member, said co-operating director rail system cooperating with the energized detector in a manner to make said control voltage increase rapidly to become a substantial voltage as said first member moves a small distance in either direction from said one exact position, then to make said control voltage remain at a substantial value as said first member moves farther away from said one exact position to the ends of desired travel range, however far, in either direction with respect to said second member.

6. The invention as set forth in claim 5, with one first and one second detector unit being axially adjustable along the member the respective units are attached to.

7. The invention as set forth in claim 5, with one first and one second detector unit being axially adjustable along the member said respective rails are attached to.

8. In a position sensing device for producing a control voltage suitable for locating a first member at an exact position with respect to a relatively movable second member, the combination comprising, a first and a second ferromagnetic circuit, a first detector unit and a first director rail included in said first ferromagnetic circuit, a second detector unit and a second director rail included in said second ferromagnetic circuit, means to produce alternating magnetic flux in said detector units, with said first detector unit attached to one member and said first director rail attached to the other member, said first director rail extended to make a relatively small air gap in said first ferromagnetic circuit as said first member moves relative to said second member from one end of desired travel, however far, to near said exact position, and with said second detector unit attached to one member and said second director rail attached to the other member, said second director rail extended to make a relatively small air gap in said second ferromagnetic circuit as said first member moves from a position near said exact position to the other end of desired travel, however far, relative to said second member; an output winding on each detector unit responsive to flux flowing through said first and second ferromagnetic circuits, a control voltage being responsive to the difference in voltage across said output windings, with the position of said first member relative to said second member determining the relative size of the air gap in, the amount of flux flowing through, and the output voltage in said output windings in said first and second ferromagnetic circuits, said gaps in said first and second ferromagnetic circuits being substantially equal and the output voltage in said output windings being substantially equal and said control voltage caused to be of zero value when said first member is at said exact position, with the voltage across said first output winding greater and of opposite phase than across said second output winding when said first member is to one side of said exact position, and the voltage across said second output winding being greater and of opposite phase than across said first output winding when said first member is to the other side of said exact position, causing said control voltage to be of one relative phase when said first member is to one side of said exact position and of opposite phase when said first member is to the other side of said exact position.

9. The invention as set forth in claim 8, with means to make the voltage contribution of the output winding on said first ferromagnetic circuit to the control voltage unequal to the voltage contribution of the output winding on said second ferromagnetic circuit to the control voltage when the control voltage is of zero value.

10. The invention as set forth in claim 8, with the reluctance of two air gaps in said first ferromagnetic circuit increasing and the reluctance of two air gaps in said second ferromagnetic circuit decreasing as said first member moves in one direction from said exact position.

11. In a position sensing device for producing a control voltage suitable for use in locating a first member at any one of a number of desired exact positions with respect to a second member, the combination comprising, a director rail system having a first director rail and a second director rail attached to said first member, a detector for each desired exact position of said first member attached to said second member, each detector having a first detector unit and a second detector unit, a first ferromagnetic circuit including said first detector unit and said first director rail, said first director rail extended and arranged to cooperate with said first detector unit with relatively small reluctance in said first ferromagnetic circuit as said first member moves from one end of desired travel to near said exact position, a second ferromagnetic circuit including said second detector unit and said second director rail, said second director rail extended and arranged to cooperate with said second detector unit with relatively small reluctance in said second ferromagnetic circuit as said first member moves from the other end of desired travel to near said exact position, each of said detectors positioned on said second member so said detector is over a point on said director rail system when said first member is at one exact position with respect to said second member, means to selectively energize one detector at a time, a first and second output winding on said first and second detector units responsive to flux flowing through said first and second ferromagnetic circuits respectively, a control voltage responsive to the voltage difference across said first and second output windings, with the position of said first member with respect to said second member determining the reluctance in said first and second ferromagnetic circuits and influencing the voltage across said first and second output windings.

12. The invention as set forth in claim 11, with the output windings connected so the voltage of said first output winding is of opposite phase to the voltage of said second output winding, with the position of said first member relative to said second member causing the voltage across said first output winding to be substantially greater than the voltage across said second output winding as said first member moves from one end of desired travel to near said exact position with respect to said second member, with means to make the voltage contribution of said first output winding to said control voltage unequal to the voltage contribution of said second output winding to said control voltage when said control voltage is substantially zero.

13. The invention as set forth in claim 11, with the output windings connected so the voltage of said first output winding is of opposite phase to the voltage of said second output winding, with the position of said first member relative to said second member causing the voltage across said first output winding to be substantially greater than the voltage across said second output winding as said first member moves from one end of desired travel to near said exact position with respect to said second member, with two air gaps included in the reluctance of one of said ferromagnetic circuits and the reluctance of each of said two air gaps increasing rapidly as said first member moves slowly in one direction from said exact position.

14. The invention as set forth in claim 11, with the output windings connected so the voltage of said first output winding is of opposite phase to the voltage of said second output winding, with the position of said first member relative to said second member causing the voltage across said first output winding to be substantially greater than the voltage across said second output winding as said member moves from one end of desired travel to near said exact position with respect to said second member, with the reluctance of said first and second ferromagnetic circuits including one air gap, with the reluctance of the air gap in said first ferromagnetic circuit increasing rapidly and the reluctance of said air gap in said second ferromagnetic circuit decreasing rapidly as said first member moves slowly in one direction from said exact position with respect to said second member, with means for longitudinal adjustment of said detector along said second member.

15. In a position sensing system for locating the position of a first member at one of a number of exact positions with respect to a relatively movable second member, the combination comprising, a detector, said detector having a first and a second detector unit, a director rail system, said director rail system having a first and a second director rail, said first detector unit attached to one of said members, said first director rail attached to the other of said members and arranged to cooperate with said first detector unit as said first member moves from one end of desired travel to near said exact position relative to said second member, said second detector unit attached to one of said members and arranged to cooperate with said second detector unit as said first member moves from the other end of desired travel to near one exact position relative to said second member, with the number of detectors plus director rail systems greater than two, means to energize one detector, means to put in operation one energized detector with one cooperating director rail system to select one of a number of exact positions of said first member relative to said second member, with the cooperation of said cooperating director rail system with said energized detector causing voltage changes in said energized detector as said first member moves relative to said second member, a control voltage responsive to voltage changes in the first and second detector units of the energized detector, and means responsive to said control voltage to locate said first member to one of a number of selected exact positions with respect to a second relatively movable member, said cooperating director rail system cooperating with the energized detector in a manner to make said control voltage increase rapidly to become a substantial voltage as said first member moves a small distance in either direction from said one exact position, then to make said control voltage remain at a substantial value as said first member moves farther away from said one exact position to the ends of desired travel range, however far, in either direction with respect to said second member, with the cooperation of a director rail system with an energized detector being in the form of reluctance in a first and second ferromagnetic circuit, with the reluctance of two air gaps in one ferromagnetic circuit increasing rapidly as said first member moves slowly a small distance to one side of one exact position.

References Cited by the Examiner

UNITED STATES PATENTS

| | | | |
|---|---|---|---|
| 2,960,688 | 11/1960 | Prochaske et al. | 318—467 |
| 3,010,063 | 11/1961 | Rhoades | 318—467 |
| 3,011,113 | 11/1961 | Jerue et al. | 318—467 |
| 3,083,323 | 3/1963 | Vigour | 318—28 |

JOHN F. COUCH, *Primary Examiner.*